UNITED STATES PATENT OFFICE.

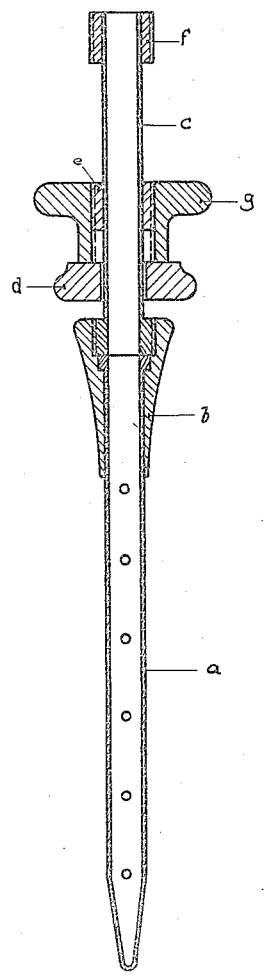

GEORG SCHEIB, OF BERLIN, GERMANY.

MEANS FOR INJECTING LIQUID OR GASEOUS MATTER UNDER PRESSURE INTO MEAT OR THE LIKE.

1,425,143.          Specification of Letters Patent.          Patented Aug. 8, 1922.

Application filed August 29, 1921. Serial No. 496,788.

*To all whom it may concern:*

Be it known that I, GEORG SCHEIB, engineer, residing at Berlin, O. 27, Germany, 18 Marcusstrasse, have invented certain new and useful Improvements in Means for Injecting Liquid or Gaseous Matter Under Pressure into Meat or the like, of which the following is a specification.

For pickling and preserving meat or the like it is usual to introduce a perforated clyster-pipe or similar injector pipe or even an ordinary nozzle through which the preserving matter is introduced into the meat to be treated. More especially when use is made of high pressures it is necessary that the instrument for the injection of the preserving matter be so secured and rendered stanch in the meat as to prevent its retrocession as also the escape of the preserving substance along the nozzle or the like by reason of the application of the high pressure. This securing and stanch-holding has hitherto been effected in a more or less cumbersome and unsatisfactory manner, for example by means of cords, guards, projections on the nozzle which sometimes are of screw-formation; frequently special fastening and stanch-making means are renounced of. This invention makes use of the natural elasticity of the meat in the fastening and stanch-making of the instrument therein; it is characterized in that the fastening and stanchness of the instrument is obtained with the aid of a graduated cone and pressure-disc. For this purpose the nozzle or the like is fitted at its rear end with an easy cone which the nozzle is inserted into the meat so as to entirely lodge therein and have an overstanding layer of the meat at its rear. The portion of meat at the rear of the base of the cone contracts owing to its innate elasticity and, by means of a pressure-disc, is firmly gripped between the base of the cone and the disc whereby a secure attachment of the instrument in the meat is obtained on the one hand and stanchity of same on the other hand.

The drawing shows the invention; *a* denotes the pointed and perforated nozzle proper which is engaged in the long drawn cone *b* having a recessed base. The extension piece *c*, screwed into the cone *b* carries a slidable recessed pressure-disc and the fixed screw-threaded rings *e* and *f*. The round nut *g*, adjustable by means of the threads on the ring *e*, pressed the disc *d* against the recessed base of the cone *b*. The threads on the ring *f* serve to receive a union-nut of the pressure-hose.

For the purpose of using the instrument, the nozzle *a* is introduced into the meat so that the base of the cone *b* is suitably covered by meat, whereafter the nut *g* is screwed towards the cone *b* to thereby press the disc *d* into the meat and gripping the meat between the base of the cone *b* and disc *d* in such a manner as to prevent the pressure in the nozzle from either ejecting the instrument from the meat or the preserving matter along the nozzle.

The pressure on the disc *d* may also be exerted by spring-power or in any other manner.

We claim:

1. An instrument for injecting a preserving fluid into meat or the like, comprising in combination a hollow needle having a plurality of lateral apertures and being adapted to be introduced into the food to be preserved; an inverted conical member affixed to said needle above said apertures; a washer arranged upon the needle above said conical member; and a nut also arranged upon the said needle above said washer, as set forth.

2. An instrument for injecting a preserving fluid into meat or the like, comprising in combination a hollow needle having a plurality of lateral apertures and being adapted to be introduced into the food to be preserved; an inverted conical member affixed to said needle above said apertures; a washer arranged upon the needle above said conical member; an externally threaded ring affixed to the needle shaft above said washer; and a nut surrounding said ring and being adapted to be turned downwards and upwards upon it, as set forth.

3. An instrument for injecting a preserving fluid into meat or the like, comprising in combination a bipartite hollow needle having a plurality of lateral apertures in its lower portion; an inverted conical member affixed to the upper end of said portion and serving as connecting means for the two portions needle; a washer arranged upon the other needle portion; and a nut also arranged upon said other needle portion and adapted to be turned down and up upon it, as set forth.

In testimony whereof I affixed my signature in presence of a witness.

GEORG SCHEIB.

Witness:
W. RUDOLPH.